United States Patent [19]
Blore et al.

[11] 3,808,843
[45] May 7, 1974

[54] DOUBLE KNIT FABRIC

[75] Inventors: James H. Blore, Greenville; Bobby L. Balcombe, Fountain Inn, both of S.C.

[73] Assignee: Phillip Fibers Corporation, Greenville, S.C.

[22] Filed: May 1, 1972

[21] Appl. No.: 248,850

[52] U.S. Cl. .................................................. 66/196
[51] Int. Cl. ........................ D04b 7/04, D04b 11/04
[58] Field of Search ............................. 66/196–200, 66/54, 25, 19

[56] References Cited
UNITED STATES PATENTS
2,149,071  2/1939  Reynolds et al. ..................... 66/197
3,561,234  2/1971  Miskcon et al. ...................... 66/196

Primary Examiner—Ronald Feldbaum

[57] ABSTRACT

A double knit fabric and method of making same. Said fabric has cylinder-needle stitches of essentially constant length in one side (face) thereof and dial-needle stitches of varying length in the other side (reverse) thereof. When employing yarns of different colors, said reverse side has an ombre appearance.

10 Claims, 10 Drawing Figures

| COURSE | FEEDS | C1 | D1 | C2 | D2 | C3 | D3 | C4 | D4 | C5 | D5 | C6 | D6 |
|---|---|---|---|---|---|---|---|---|---|---|---|---|---|
| 6 | 11 & 12 | X | X | X | O | X | X | O | O | O | X | O | O |
| 5 | 9 & 10 | X | X | X | O | X | X | O | O | O | X | O | O |
| 4 | 7 & 8 | X | O | X | X | X | O | O | X | O | O | O | X |
| 3 | 5 & 6 | X | O | X | X | X | O | O | X | O | O | O | X |
| 2 | 3 & 4 | X | X | X | O | X | X | O | O | O | X | O | O |
| 1 | 1 & 2 | X | X | X | O | X | X | O | O | O | X | O | O |

DOUBLE KNIT FABRIC

This invention relates to a double knit fabric having a novel structure and appearance. The invention further relates to a method of knitting said fabric.

A double knit fabric has stitches on one side, commonly referred to as the face, of the fabric that are formed by one set of needles, e.g., cylinder needles. The stitches on the reverse or back of the fabric are formed by a second set of needles, e.g., dial needles. The cylinder needles can be selected individually by mechanical or electronic means to form a predetermined stitch pattern. Mechanical methods of selection include various means such as: inclined wheels; multiple cam raceways; selector drums; punched tapes; disks; punched cards; and multistep jacks. Predetermined stitch patterns can be set by arranging the jacks in said inclined wheels, needle butts in said cam raceways, sliders in said drums, holes in said punched tapes or cards, or parts in said disks or jacks. Certain needles can thus be selected to knit certain yarns and the non-selected needles will miss knitting said yarns. In this way, Jacquard designs in two, three or four, or more, colors can be knitted on the face side of the fabric.

The reverse or back of the fabric is formed by the dial needles. Dial needles on double knit knitting machines do not have individual needle selecting mechanisms such as the cylinder needles have. Said dial needles are selected to knit, tuck, or welt by the action of a cam on the needle butt which pushes the needle to its knit position. The needle butts ride in one of two or one of four cam tracks, depending upon the type of machine employed. By arranging the needles with their butts in various cam tracks, it is possible to form patterns up to two needles wide on machines with two cam tracks, or patterns up to four needles wide on machines with four cam tracks; for example, Swiss Pique or "bird's eye." Such patterns can be obtained by arranging the dial needles to knit a predetermined sequence.

For example, when two-color Jacquard designs are knitted on the cylinder needles, the dial needles are usually arranged to knit a sequence in the following manner on a 24 feed machine:

Feeds 1, 5, 9, 13, 17, and 21: knit odd needles; miss even needles

Feeds 2, 6, 10, 14, 18, and 22: knit odd needles; miss even needles

Feeds 3, 7, 11, 15, 19, and 23: knit even needles; miss odd needles

Feeds 4, 8, 12, 16, 20, and 24: knit even needles; miss odd needles

This sequence provides a Swiss Pique back having an overall effect or appearance comprising the two colors shown on the face of the fabric. When three-color designs are knitted on the cylinder needles, the dial needles are arranged to knit a "bird's eye" back by knitting the following sequence:

Odd feeds: knit odd needles; miss even needles

Even feeds: knit even needles; miss odd needles

The result is an overall effect or appearance comprising the three colors knitted on the face of the fabric. This and the above overall effect or appearance is caused by, or is the result of the dial needle stitches all having the same length.

The length of yarn in each dial-needle stitch can be controlled by the distance that the dial needle is pulled back from the verge of the dial by the dial-needle stitch cam. The farther the stitch cam pulls the needles back the longer the length of the stitch becomes. For example, in prior art two-color Jacquard double knit fabrics, the length of the dial-needle stitches is usually the same as the length of the cylinder-needle or face stitches. In prior art three-color Jacquard double knit fabrics, the length of the dial-needle stitches is usually two-thirds the length of the cylinder-needle or face stitches. In prior art four-color Jacquard fabrics, the length of the yarn in the dial-needle stitches is usually one-half the length of the cylinder-needle or face stitches. In each of the three fabrics, the length of yarn in each of the dial-needle stitches is essentially equal when all the dial-needle stitch cams are set to pull the dial-needle stitches the same distance from the verge of the dial. The same condition exists in other prior art double knit fabrics. The length of the yarn in each dial-needle stitch will be the same in all stitches along each course when the normal or customary knitting methods of the prior art are employed.

The above-described overall effect or appearance of the back side of prior art double knit fabrics is usually much less pleasing than the face side of the fabric. In many instances, this limits the use of the fabric. It would be desirable to have a double knit fabric wherein both sides of the fabric, while different, have an essentially equally pleasing appearance. Such a fabric would have increased utility. Either side of the fabric could be used as the face or outer side of a garment, depending upon the wishes of the designer. Since the two sides would be complementary, they could both be used as the face or outer side in different portions of the same garment. For example, a jacket made using one side of the fabric as the face and a skirt, pants, or trousers made using the other side of the fabric as the face. A double knit fabric wherein one side has a defined pattern effect or appearance formed of selected colors and the other side has an ombre effect or appearance formed of said colors would be such a fabric.

It has now been discovered that an ombre effect or appearance can be obtained in one side of double knit fabrics by causing the stitches thereon, e.g., dial-needle stitches, to be of varying length, and controlling the stitches on the other side, e.g., cylinder-needle stitches, to be of practically or essentially the same length.

Thus, in accordance with the invention, there is provided a double knit fabric comprising: a first side and an opposite second side knitted from a plurality of individual yarns; said first side having knit stitches of an essentially constant length formed therein in each yarn of said plurality of yarns in accordance with a predetermined pattern; and said second side having knit stitches of varying length formed therein in each yarn of said plurality of yarns.

Further according to the invention, there is provided a method of knitting the courses of a double knit fabric having a first side and an opposite second side knitted from a plurality of individual yarns, which method comprises: forming groups of first side knit stitches having an essentially constant stitch length in individual yarns of said plurality of yarns in accordance with a predetermined pattern; and forming individual second side knit stitches of varying length in individual yarns at alternating positions along each course.

In practicing the method of the invention, a positive-feed device is preferably employed to feed yarn to the needles and control the length of the cylinder-needle stitches. Controlling the length of each cylinder-needle stitch assures an even fabric because all cylinder-needle stitches are practically the same size. This also reduces the problem of barre' so prevalent when knitting plain double knit fabrics from textured filament yarns.

Said positive-feed device can be any of such devices known to the art. For example, a free-running wheel turned by a tape drive with the yarn running between said wheel and said tape, two meshed gears between which the yarn runs, or a rotating wheel around which the yarn runs. The friction point of the device draws the yarn from the package on which the yarn is wound and delivers it to the needles at a controlled rate of speed as determined by the speed of the driving mechanism. Said positive-feed device controls the length of the stitch to a greater extent than the stitch cam setting. A longer stitch is formed when the surface speed of said friction points is increased. A tighter or smaller stitch is formed when the surface speed of said friction points is decreased. Whether the yarn speed is fast, or whether the yarn speed is slow, the stitches on the back of the fabric (dial stitches) will be the same size on that course if all the cylinder needles knit or if alternate cylinder needles knit. In the practice of this invention, groups of cylinder needles in a given course(s) do not knit and, as discussed further below, the dial stitches vary in size.

In the prior art it is not customary to knit large Jacquard designs with a positive-feed device in action because when a multiplicity of cylinder needles are caused to miss taking the yarn there will be an excess flow of yarn at the missed needles with resultant difficulties. Said difficulties are avoided in the practice of the present invention by pulling all the dial-needle cam settings back to their farthermost extremity. This causes the excess yarn that would normally be knitted into the cylinder needles to be taken into the dial needles. A longer dial-needle stitch will then result in the portion of a course where no cylinder needles are knitting face side stitches. Where cylinder needles are pushed up to knitting position by the patterning mechanism, portions of the yarn are taken by both dial and cylinder needles. Where the patterning mechanism pushes up no cylinder needles, the yarn forced into the needles by the positive-feed device all goes into the dial-needle stitches. This causes the formation of relatively large stitches on the back of the fabric when the dial cam settings are pulled back at the areas opposite the missed cylinder-needle stitches. When in a given course another group or block of cylinder needles is selected to knit, a portion of the yarn is again drawn into the face or cylinder needle stitches away from the dial-needle or back stitches. This causes the formation of relatively short stitches on the back of the fabric. Thus, said back knit stitches vary in relative length from short, when opposite a group of face knit stitches, to long when not opposite a group of face knit stitches.

Unlike the face of the fabric where the cylinder needles are positively selected by the pattern-wheel mechanism, there is formed on the back of the fabric a pattern having an ombre effect or appearance. This is caused by the cylinder needles intermittently robbing the dial needles of a portion of their share of the yarn. Since the dial needles do not have an individual needle selection mechanism which is positive and controlling like that of the cylinder needles, the outline of the pattern on the back of the fabric is indistinct or muted.

There is no limit to the two-, three-, four-, or more color designs that can be employed in the practice of the invention. However, it is preferred that said designs be at least five, more preferably at least six, cylinder needles wide in order to obtain the best ombre effect or appearance.

The above description of the fabrics of the invention, and methods of knitting same in accordance with the invention, has been in terms of circular double knit machines equipped with cylinder and dial needle housings, a positive-feed device, and a pattern mechanism for the cylinder needles. The Mellor Bromley machine described further below is an example of such a machine. However, the invention is not limited to employing such machines. It is possible to obtain vertical strips having the ombre effect or appearance on plain machines having two cam tracks in the cylinder and fitted with positive-feed devices. The cylinder needles will be arranged so that certain needle butts will ride in the top cam track and the remaining butts will ride in the bottom cam track. An example would be a three-fourth inch wide vertical ombre stripe knitted on a plain 18-cut double knit machine with 1,680 needles by arranging groups of 20 needles with their butts in the top track and groups of 20 needles with their butts in the bottom track. The dial cams would be pulled back to their farthermost extremity and arranged by setting odd feeds to knit odd needles and miss even needles. The even feeds would knit even needles and miss odd needles. Odd feeds would be threaded with one color and even feeds with a different color.

FIG. 3 is a pattern diagram for a three-color double knit fabric in accordance with the invention.

FIG. 5 is a stitch diagram of another two-color double knit fabric in accordance with the invention.

Figure 1:
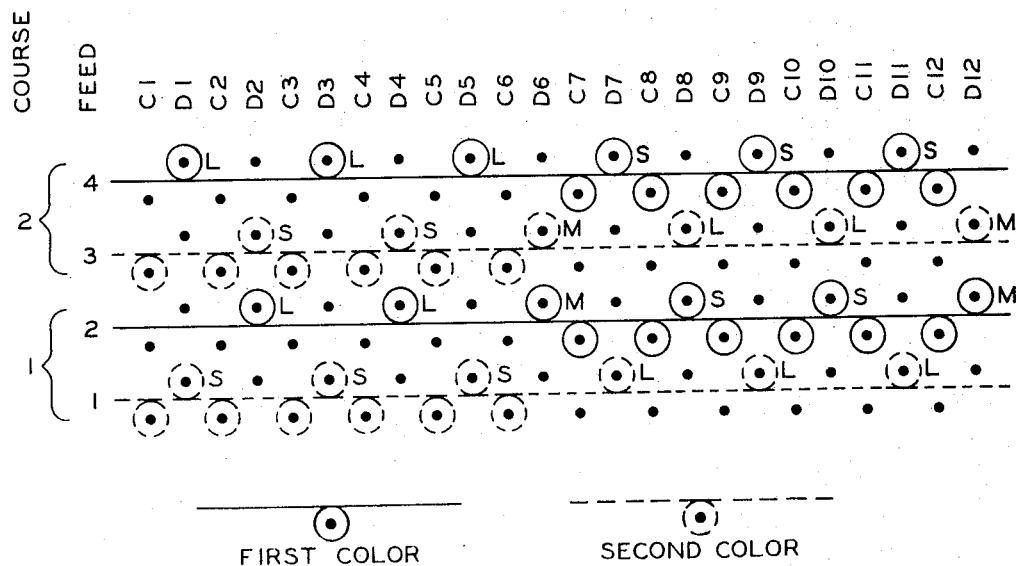
FIG. 1 is a pattern diagram for a two-color double knit fabric in accordance with the invention.

Referring now to the drawings, the invention will be more fully explained.

Figure 2:
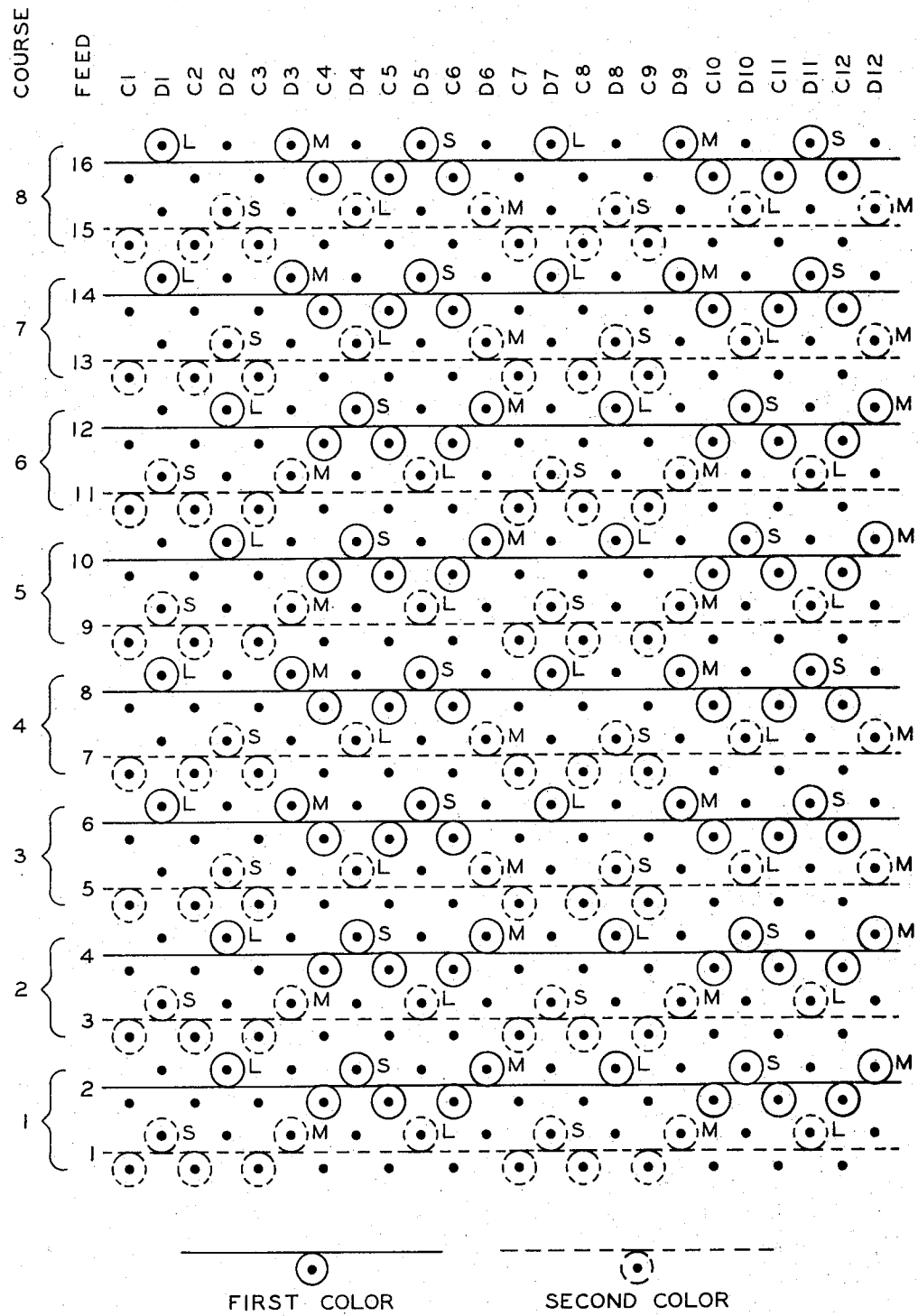
FIG. 2 is a stitch diagram for the fabric of FIG. 1.

In FIG. 1 there is shown the pattern diagram for a swatch of cloth six courses high and twelve wales wide. The repeat pattern of the fabric of FIG. 1 can comprise as little as courses 1 to 4 and the 12 wales shown, or can comprise more such as shown in FIG. 2. In FIG. 2, two more courses and 12 more wales have been included so as to more clearly show the repeat aspects of the pattern. The wales C1, C2, C3 — formed by the cylinder needles alternate the fabric with the wales D1, D2, D3 — formed by the dial needles. Thus, each cylinder wale in the interior of the fabric is positioned between two dial wales. In the finished fabric the set of cylinder wales is in a plane parallel to the set of dial wales, and the fabric is contracted laterally so that the cylinder wales contact each other to form one side or the face of the fabric and the dial wales contact each other to form the other opposite side of the fabric, sometimes referred to as the reverse or back side.

Figure 4:
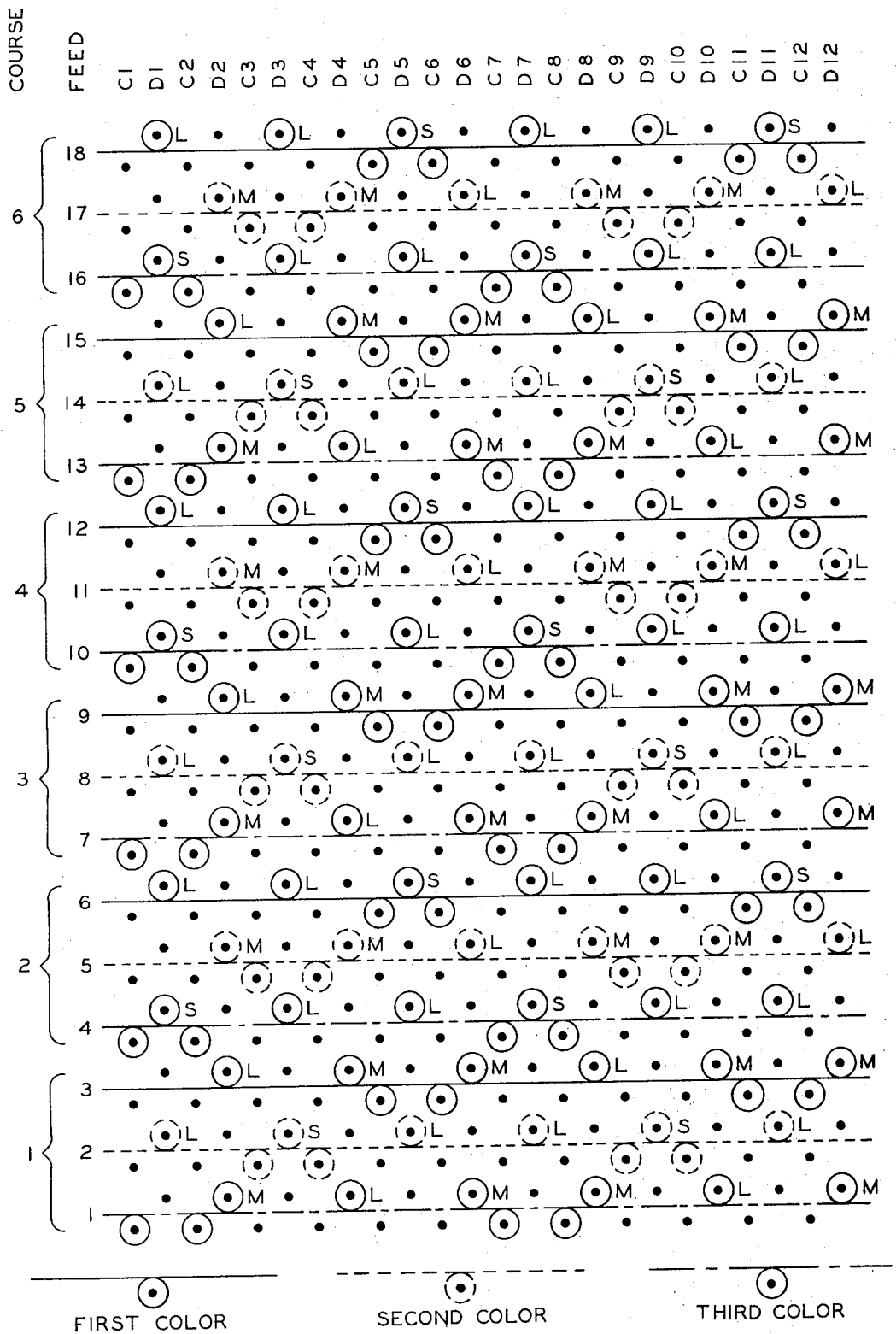
FIG. 4 is a stitch diagram for the fabric of FIG. 3.
Figure 6:
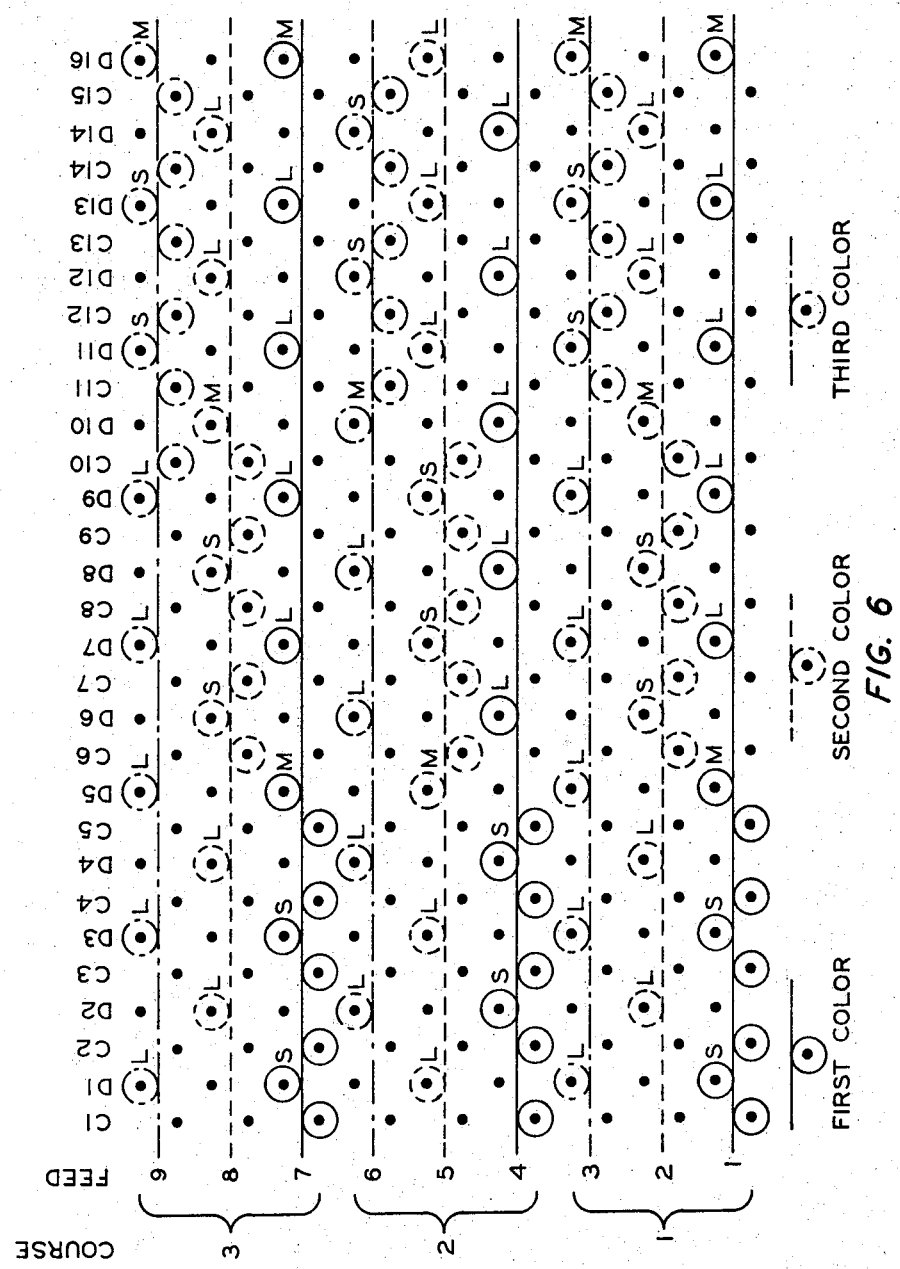
FIG. 6 is a stitch diagram of another three-color double knit fabric in accordance with the invention.

In FIGS. 1 and 2 each course comprises a first, or odd numbered feed, or yarn and a second, or even numbered feed, or yarn. Each feed or yarn in each course has at least one group of first side or face stitches formed therein by the cylinder needles. Said face stitches are formed at groups of wales in a first set of alternating wales. For example, the group of wales C1, C2, and C3 in feed 1, and the group of wales C4, C5, and C6 in feed 2 in the set of alternating wales C1 – C6. As discussed further hereinafter, said face knit stitches are all of practically or essentially the same stitch length, e.g., contain essentially the same length of yarn. It will be noted that when a feed or yarn contains more than one group of face knit stitches the groups are positioned at spaced apart locations along the course. See feed 1 in FIGS. 2 and 4. It will also be noted that the groups of face knit stitches in the other feed(s) or yarn(s) are positioned at spaced apart locations along the course which follows or succeeds said first-mentioned spaced apart locations. Each feed or yarn in each course also has individual second side or back knit stitches of varying length formed therein by the dial needles at alternating wales in a second set of alternating wales, for example, at wales D1 – D6. It is preferred that the dial-needle stitches in the individual yarns in a course alternate from yarn to yarn, e.g., one yarn or feed knit at odd dial needles and the other knit as even numbered dial needles, but this is not essential. When using an even number of feeds per course, it is preferred to switch or reverse the knitting order of the dial needles, such as from course to course, or each two courses, to enhance the ombre effect. For example, see the two-course reverse of courses 1–2 and courses 3–4 in FIG. 2. The described arrangement of cylinder-needle stitches and dial-needle stitches can be in accordance with any suitable or desired predetermined pattern. Preferably, the number of courses and the selection of the cylinder needles is controlled by a pattern generating mechanism, such as a Jacquard mechanism, as described above.

Referring to FIGS. 3, 4, 5, and 6, the structure of the fabrics there illustrated will be readily understood by those skilled in the art in view of the above description of FIGS. 1 and 2. In FIGS. 1, 2, 3, and 4, the groups of cylinder-needle stitches contain either 2 or 3 stitches. Some ombre effect or appearance can be obtained with small stitch groups. However, for enhanced ombre effect or appearance it is preferred that the groups of cylinder-needle stitches contain at least five, more preferably at least six, stitches.

The ombre effect or appearance of the invention is created by the variation in the length of the dial-needle stitches relative to the practically or essentially constant or equal length of the cylinder-needle stitches. The variation in the length of the dial-needle stitches is accomplished by the combination of steps comprising: introducing each individual yarn into the knitting zone at a substantially constant rate, forming groups of first side or face knit stitches in each individual yarn at spaced apart locations along each course, and forming the individual second side or back knit stitches in each individual yarn at alternating positions along each course, with said alternating positions including positions which are opposite said groups of first side stitches and positions which are not opposite said groups of first side stitches, e.g., positions which are opposite spaces between said groups of first side stitches.

As mentioned, the cylinder-needle stitches are controlled to be practically or essentially of the same length, and the dial-needle cams are pulled back to draw the longest stitch permitted by the yarn requirements of the cylinder needles. However, the length of the dial knit stitches varies, depending upon their position along the course. The length of the dial or back side knit stitches relative to the length of the cylinder or face side knit stitches varies from short, when opposite one of said groups of face knit stitches, to long when not opposite one of said groups of face knit stitches. Thus, referring to FIG. 2, for example, in course 1, feed 1, dial-needle stitches D1 and D7 will be short stitches because they are opposite groups of cylinder-needle stitches, and dial-needle stitches D5 and D11 will be long stitches because they are not opposite a group of cylinder-needle stitches. Dial-needle stitches such as D3 and D9, in course 1, feed 1, which are adjacent the end of a group of cylinder-needle knit stitches, will have a length which is intermediate the lengths of said short stitches and said long stitches. Said short, intermediate, and long dial-needle stitches are marked on FIGS. 2, 4, 5, and 6 with the letters "S," "M," "L," respectively.

In said drawings, a dial-needle stitch marked "S" is a short stitch because it is between two cylinder-needle stitches, is competing with the cylinder needles for the yarn which is being fed at a controlled essentially constant rate, and is being "pulled" on both sides by the cylinder-needle stitches. In contrast, a dial-needle stitch marked "L" is a long stitch because there are no cylinder needles competing for the yarn. At the locations where no cylinder needles are knitting, the "excess" yarn thus all goes into the dial-needle stitches. A dial-needle stitch marked "M" is intermediate in length because it is adjacent the end of a group of cylinder-needle stitches and is being pulled on only one side. In many instances, said intermediate length stitches will be approximately the same length as the cylinder-needle stitches. Referring to FIG. 5, a dial-needle stitch such as D3 in feed 1, course 1, will usually be representative of the shortest dial-needle stitch because it is opposite the center of a substantial group of cylinder-needle stitches. Similarly, a dial-needle stitch such as D9 in feed 1, course 1, will usually be representative of the longest dial-needle stitch because it is at the center of a location or area where no cylinder needles are knitting.

The lengths of the various dial-needle stitches are thus relative to the length of the cylinder-needle stitches. While the lengths of the various stitches probably change upon being released by the knitting mechanism, the average relative lengths thereof in the finished fabric will remain essentially unchanged. The invention is not limited to any particular ranges of actual stitch lengths or relative stitch lengths. Both of said stitch lengths can vary with the particular yarn being used, the knitting conditions, the pattern employed, etc. However, as a guide to those skilled in the art, it is presently preferred that the length of the dial-needle stitches vary from approximately one-half the length of the cylinder-needle stitches when opposite a group of said cylinder-needle stitches up to approximately twice the length of the cylinder-needle stitches when not opposite a group of cylinder-needle stitches.

Figure 7:
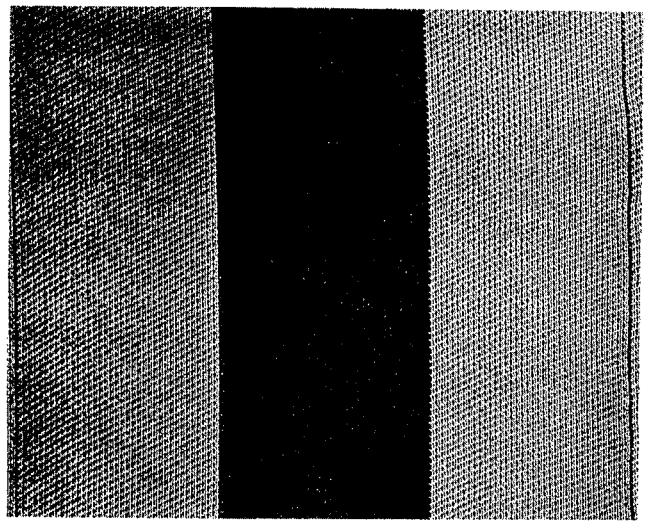
FIG. 7 is a photograph of one side of a three-color double knit fabric in accordance with the invention.
Figure 8:
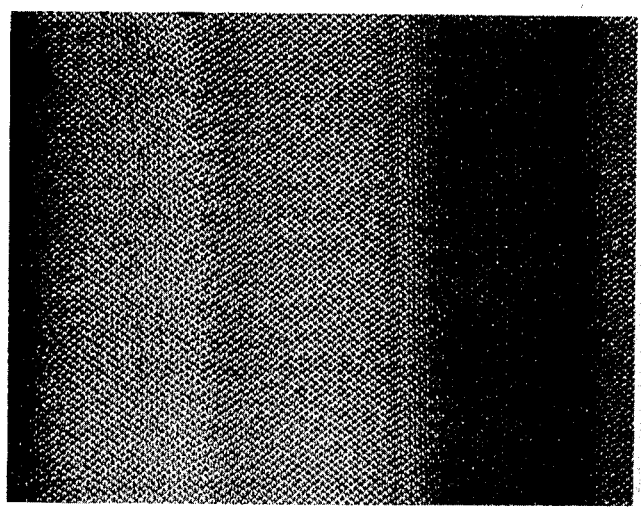
FIG. 8 is a photograph of the opposite side of the fabric of FIG. 7.

Referring now to FIGS. 7 and 8, those figures are photographic reproductions of a three-color double knit fabric knitted in accordance with the invention. Details of the knitting of said fabric are set forth in the Example below. FIG. 7 is a photograph of one side (face or cylinder-needle side) of the fabric. In color, reading from left to right, the colors in the pattern are red, navy blue, and light blue. FIG. 8 is a photograph of the opposite side (dial-needle side) of the fabric when turned over vertically. Even in black and white, said FIG. 8 clearly shows the ombre effect of the invention. Reading from left to right, the colors in FIG. 8 shade or blend from dark blue, through a bluish red, to dark red.

Figure 9:
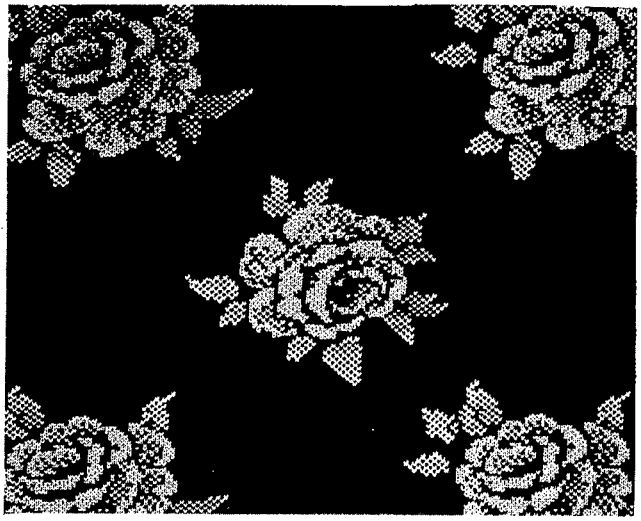
FIG. 9 is a photograph of one side of a two-color double knit fabric in accordance with the invention.
Figure 10:
FIG. 10 is a photograph of the opposite side of the fabric of FIG. 9.

FIGS. 9 and 10 are photographic reproductions of another double knit fabric knitted in accordance with the invention. This fabric is in two-colors and was knitted on the same machine as the fabric of FIGS. 7 and 8. FIG. 9 is a photograph of one side (face or cylinder-needle side) of the fabric. In color, the background is maroon and the rose pattern is gray. FIG. 10 is a photograph of the opposite side (dial-needle side) of the fabric. In color, the background is gray and the other color is predominantly maroon. Even in black and white, said FIG. 10 clearly shows the ombre effect of the invention.

EXAMPLE

The fabric of FIGS. 7 and 8 was knitted on a Wildt Mellor Bromley Ltd. circular double knit machine, Type 8/RJ, having a 30-inch diameter cylinder, and employing 18 dial needles per inch and 18 cylinder needles per inch. The yarns used were 150 denier, 34 filament, textured set Quintess polyester yarns. The pattern area was 112 needles wide. Feeds 1, 4, 7, 10, 13, 16, 19, and 22 were caused to knit the first color of 38 cylinder needles and miss the next 74 cylinder needles. Feeds 2, 5, 8, 11, 14, 17, 20, and 23 were caused to miss the first 38 cylinder needles, knit the second color on the next 37 cylinder needles, and miss the remaining 37 cylinder needles. Feeds 3, 6, 9, 12, 15, 18, 21, and 24 were caused to miss the first 75 cylinder needles and knit the third color on said remaining 37 cylinder needles. The dial needles were set to draw a long stitch by pulling the dial needle cams back. The odd dial needles knitted odd feeds and the even dial needles knitted even feeds. The finished fabric had a weight of approximately 12.5 ounces per square yard.

While the invention has been described with particular reference to the use of colored yarns, the invention is not so limited. Colored yarns are preferred. However, yarns of cross-dyeing characteristics, such as nylon and polyester, can be used and the fabric piece dyed. Any suitable type of yarns having suitable strength and elongation characteristics can be used in the practice of the invention. Examples of suitable yarns include both monofilament and multifilament yarns made of nylon, polyester, or olefin. The synthetic yarns are presently preferred. However, natural yarns are not excluded provided they have suitable strength and elongation characteristics. The yarns used can be bulked or modified in other ways if desired. Generally speaking, it is preferred that the yarn size be in the 70 to 200 denier range, and the denier per filament be in the range from about 1.5 to 5 denier.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

We claim:

1. A double knit fabric comprising:
    a first set of alternating wales forming the face of said fabric, and a second set of alternating wales forming the reverse or back side of said fabric, each interior wale of said first set of alternating wales being positioned between two wales of said second set of alternating wales;
    each course in said fabric comprising at least a first yarn and a second yarn;
    each said first yarn in each said course having a group of face knit stitches of essentially equal stitch length formed therein at a first group of wales in said first set of alternating wales in accordance with a predetermined pattern;
    each said second yarn in each said course having a group of face knit stitches of said essentially equal length formed therein at a second group of wales in said first set of alternating wales in accordance with said predetermined pattern; and
    in each course, each said first yarn and each said second yarn having individual back knit stitches of varying length formed therein at alternating wales in said second set of wales, and wherein the length of said back knit stitches relative to the length of said face knit stitches varies from short, when opposite one of said groups of face knit stitches, to long when not opposite one of said groups of face knit stitches.

2. A fabric in accordance with claim 1 wherein each said course consists of a first yarn and a second yarn.

3. A fabric in accordance with claim 1 wherein:
    each said course consists of a first yarn, a second yarn, and a third yarn; and
    each said third yarn in each said course has a group of face knit stitches of said essentially equal stitch length formed therein at a third group of wales in said first set of alternating wales in accordance with said predetermined pattern.

4. A fabric in accordance with claim 3 wherein the length of said back knit stitches relative to the length of said face knit stitches varies from approximately one-half up to approximately twice the length of said face knit stitches.

5. A method of knitting the courses of a double knit fabric having a first side and an opposite second side knitted from a plurality of individual yarns, which method comprises:
    introducing each individual yarn of said plurality of yarns into a knitting zone at a substantially constant feed rate;
    forming spaced apart groups of first side knit stitches having an essentially constant stitch length in each of said individual yarns at spaced apart locations along each of said courses in accordance with a predetermined pattern; and forming individual second side knit stitches of varying length in each of said individual yarns at alternating positions along each course including positions opposite said groups of first side stitches and positions opposite spaces between said groups of first side stitches, with the length of said second side stitches relative to the length of said first side stitches varying from short, when opposite one of said groups of first side stitches, to long when not opposite one of said groups of first side stitches;

said second side knit stitches being formed by drawing each of said individual yarns to the maximum stitch length permitted by said yarn feed rate and the yarn requirements in forming said spaced apart groups of first side knit stitches.

6. A method according to claim 5 wherein:

said plurality of yarns comprises at least a first yarn and a second yarn;

a group of said first side stitches is formed in said first yarn only, at a series of spaced apart first locations in said courses of said fabric;

a group of said first side stitches is formed in said second yarn only, at a series of spaced apart second locations in said courses of said fabric, with each said second location succeeding a said first location;

individual second side stitches are formed in said first yarn at alternating positions opposite said first and second locations; and individual second side stitches are formed in said second yarn opposite said first and second locations at alternating positions which alternate said first-mentioned alternating positions.

7. A method according to claim 6 wherein the length of said second side stitches varies from approximately one-half the length of said first side stitches when opposite a group of said first side stitches up to approximately twice the length of said first side stitches when not opposite a group of said first side stitches.

8. A double knit fabric comprising:

a first side and an opposite second side knitted from a plurality of individual yarns;

said first side having spaced apart groups of knit stitches of an essentially constant length formed therein in each yarn of said plurality of yarns in accordance with a predetermined pattern; and said second side having knit stitches of varying length formed therein in each yarn of said plurality of yarns, with the length of said second side stitches relative to the length of said first side stitches varying from short, when opposite one of said groups of first side stitches, to long when not opposite one of said groups of first side stitches.

9. A method according to claim 6 wherein:

said plurality of yarns includes a third yarn;

a group of said first side stitches is formed in said third yarn only, at a series of spaced apart third locations in said courses of said fabric, with each said third location succeeding a said second location; and individual second side stitches are formed in said third yarn opposite said first, second, and third locations at alternating positions which correspond to said first mentioned alternating positions.

10. A method according to claim 9 wherein the length of said second side stitches varies from approximately one-half the length of said first side stitches when opposite a group of said first side stitches up to approximately twice the length of said first side stitches when not opposite a group of said first side stitches.

* * * * *